United States Patent [19]

Daniels et al.

[11] Patent Number: 5,701,347

[45] Date of Patent: Dec. 23, 1997

[54] AUDIO SYSTEM FOR A PERSONAL COMPUTER

[75] Inventors: George R. Daniels, Spring, Tex.; Thor R. Halseth, Simi Valley; Daniel R. Vehse, Oxnard, both of Calif.

[73] Assignee: Compaq Computer Corporation, Houston, Tex.

[21] Appl. No.: 723,281

[22] Filed: Sep. 30, 1996

Related U.S. Application Data

[63] Continuation of Ser. No. 303,419, Sep. 9, 1994, abandoned, which is a continuation-in-part of Ser. No. 24,922, Jun. 23, 1994, Pat. No. Des. 366,478.

[51] Int. Cl.⁶ .................................................... H04R 5/00
[52] U.S. Cl. ................... 381/24; 381/88; 381/120; 381/188; 381/205; 361/681; 361/682; 361/683; 248/346.03; 248/917
[58] Field of Search .......................... 381/24, 88, 90, 381/188, 205, 120; 248/346.03, 676, 678, 917–918; 361/681, 682, 683; 312/7.2

[56] References Cited

U.S. PATENT DOCUMENTS

| | | |
|---|---|---|
| D. 366,478 | 1/1996 | Daniels et al. . |
| 4,078,155 | 3/1978 | Botros et al. . |
| 4,115,659 | 9/1978 | Spanel et al. . |
| 4,237,339 | 12/1980 | Bunting et al. . |
| 4,338,492 | 7/1982 | Snopko . |
| 4,396,799 | 8/1983 | Franzen et al. . |
| 4,414,432 | 11/1983 | Skerlos et al. . |
| 4,491,694 | 1/1985 | Harmeyer . |
| 4,577,187 | 3/1986 | Barr et al. ............................... 248/917 |
| 4,736,407 | 4/1988 | Dumas . |
| 5,040,206 | 8/1991 | Tokumasu et al. . |
| 5,104,086 | 4/1992 | Ramey, III et al. ................... 248/918 |
| 5,138,651 | 8/1992 | Sudo . |
| 5,283,638 | 2/1994 | Engberg et al. . |
| 5,291,556 | 3/1994 | Gale . |
| 5,297,198 | 3/1994 | Butani et al. . |
| 5,400,408 | 3/1995 | Lundgren et al. ..................... 381/159 |
| 5,402,499 | 3/1995 | Robison et al. . |
| 5,434,913 | 7/1995 | Tung et al. . |
| 5,436,654 | 7/1995 | Boyd et al. . |
| 5,448,647 | 9/1995 | Koizumi ................................... 381/24 |
| 5,587,876 | 12/1996 | O'Brien et al. ......................... 361/682 |

*Primary Examiner*—Curtis Kuntz
*Assistant Examiner*—Duc Nguyen
*Attorney, Agent, or Firm*—Fish & Richardson P.C.

[57] ABSTRACT

An audio system for multimedia computer systems and method for use are provided including an audio module having speakers, a microphone and associated circuitry. The audio module is adapted to be interposed between a monitor and a monitor pedestal such that the audio module swivels and tilts in concert with the monitor. The circuitry is adapted to drive the audio module speakers and to drive only one speaker and the microphone in a speaker phone mode.

17 Claims, 9 Drawing Sheets

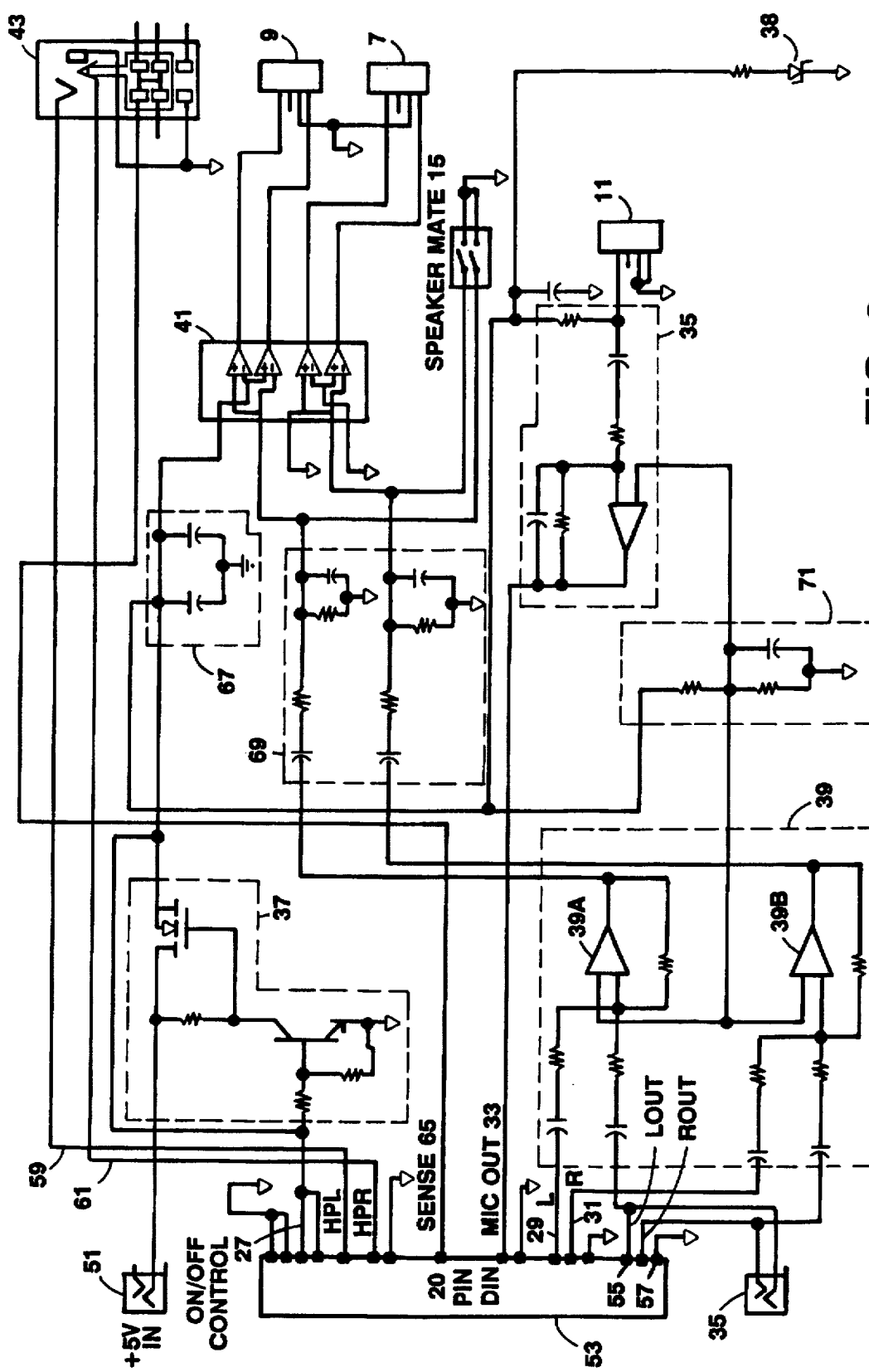

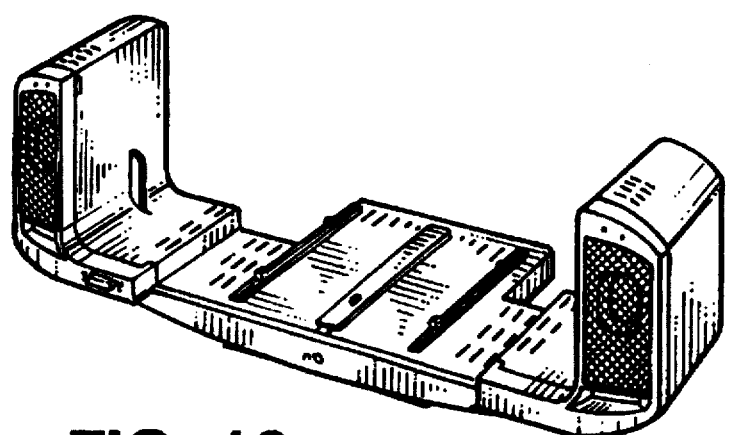
FIG. 10
FIG. 11
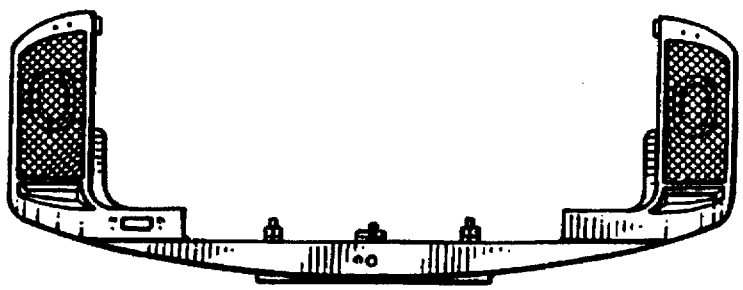
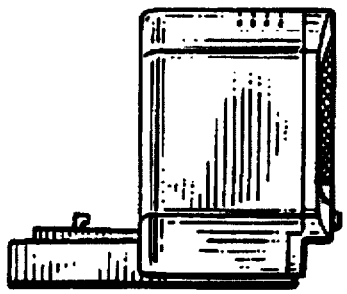 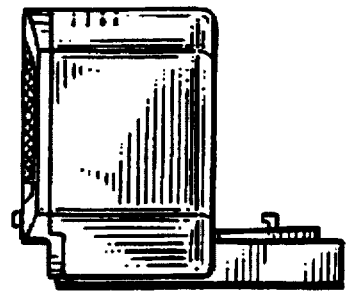
FIG. 12   FIG. 13

AUDIO SYSTEM FOR A PERSONAL COMPUTER

RELATED APPLICATIONS

This application is a file wrapper continuation of U.S. application Ser. No. 08/303,419, filed Sep. 9, 1994, now abandoned, which is a continuation-in-part of application Ser. No. 29/024,922, filed Jun. 23, 1994, now U.S. Pat. No. Des. 366,478.

FIELD OF THE INVENTION

The invention relates to an audio system for a personal computer.

BACKGROUND OF THE INVENTION

A recent trend in personal computing has been toward the multimedia computer, which provides high quality audio as well as video output. Such systems have typically included a pair of add-on speakers which are placed near the monitor and plugged into a sound board in the computer. In some cases, a microphone is also placed near the monitor to provide an input to the sound board. However, in such systems, the mobility of the speakers and the microphone relative to one another tends to frustrate attempts at echo cancellation, resulting in undesirable feedback.

As noted, upgrading an existing computing system to multimedia functionality typically requires a pair of add-on speakers and a plug-in sound board. However, use of add-on speakers consumes valuable desktop space and requires separate re-orientation of the monitor and speakers as the user changes position. Typically, over-the-counter multimedia computer systems have speakers that are built into the computer housing or built into the monitor or, in systems such as those currently marketed by IBM, built into the pedestal of the monitor. However, the audio components of these over-the-counter systems are not readily upgraded or replaced without replacing expensive associated equipment, such as a monitor.

SUMMARY OF THE INVENTION

In one aspect of the invention, an audio module for use with a monitor is provided. The monitor is of the type that is supported by a pedestal at a mechanical interface and is removable from the pedestal at the interface. The interface includes an element on the monitor that mates removably with an element on the pedestal. The audio module comprises a base that includes two mating devices, one of which is configured to mate with the interface element on the monitor. The other mating device is configured to mate with the interface element of the pedestal so that the audio module may be interposed between the monitor and the pedestal. The audio module also comprises a speaker mounted on the base.

In another aspect of the invention, an audio module for use with a monitor is provided. The monitor is of the type that is supported by a pedestal at a mechanical interface and is removable from the pedestal at the interface, the pedestal permits reorienting the monitor relative to the pedestal, and the interface includes an element on the monitor that mates removably with an element on the pedestal. The audio module comprises a base that includes two mating devices, one of which is configured to mate with the interface element of the monitor, the other of which is configured to mate with the interface element of the pedestal so that the module may be interposed between the monitor and the pedestal. The base is configured to be held in a fixed position relative to the monitor, regardless of reorientation of the monitor relative to the pedestal. The base has two speakers mounted at opposite ends of the base and has a microphone mounted at one end of the base.

In another aspect of the invention, an audio module is provided that comprises a base portion and a speaker portion adjacent the base portion. The speaker portion houses a speaker. The base portion has a first surface and a second surface. The first surface is adapted to removably engage a pedestal mating surface on a monitor. The second surface is adapted to removably engage a monitor pedestal such that the audio module can be removably interposed between the pedestal and the monitor. The audio module is coupled between the monitor and pedestal such that the module and the monitor move in concert relative to the pedestal.

In yet another aspect of the invention, an audio module is provided that comprises a substantially planar base portion that houses audio circuitry. A first surface of the base portion is adapted to removably engage a pedestal mating surface on a monitor. A second surface of the base portion is adapted to removably engage a monitor pedestal such that the audio module can be removably interposed between the pedestal and the monitor. The audio module also comprises speaker portions that are disposed adjacent ends of the base portion. Each of the speaker portions house a speaker that is operably connected to the audio circuitry. The audio module is coupled between the monitor and the pedestal such that the module and the monitor tilt and swivel in concert relative to the pedestal.

Still further, another aspect of the invention provides a method of upgrading a computer monitor attached to a supporting pedestal and that is capable of being swiveled and tilted. The method comprises the steps of detaching the monitor from the pedestal, attaching an audio module to the monitor at the place where the monitor was detached from the pedestal so that the audio module moves with the monitor when the monitor is swiveled and tilted, and attaching the module to the pedestal at the place where the pedestal was detached from the monitor.

Yet another aspect of the invention provides an ornamental design for an audio module.

Other advantages and features of the invention will be apparent from the following description and from the claims.

BRIEF DESCRIPTION OF THE DRAWINGS

FIG. 3 is a schematic diagram of an audio circuit for a multimedia computer;

FIG. 10 is a front, right side, top perspective view of the audio module showing our new design;

FIG. 11 is a front elevational view thereof;

FIG. 12 is a left side elevational view thereof;

FIG. 13 is a right side elevational view thereof;

DETAILED DESCRIPTION

Embodiments of the invention will now be described in detail with reference to the accompanying figures.

Figure 1:
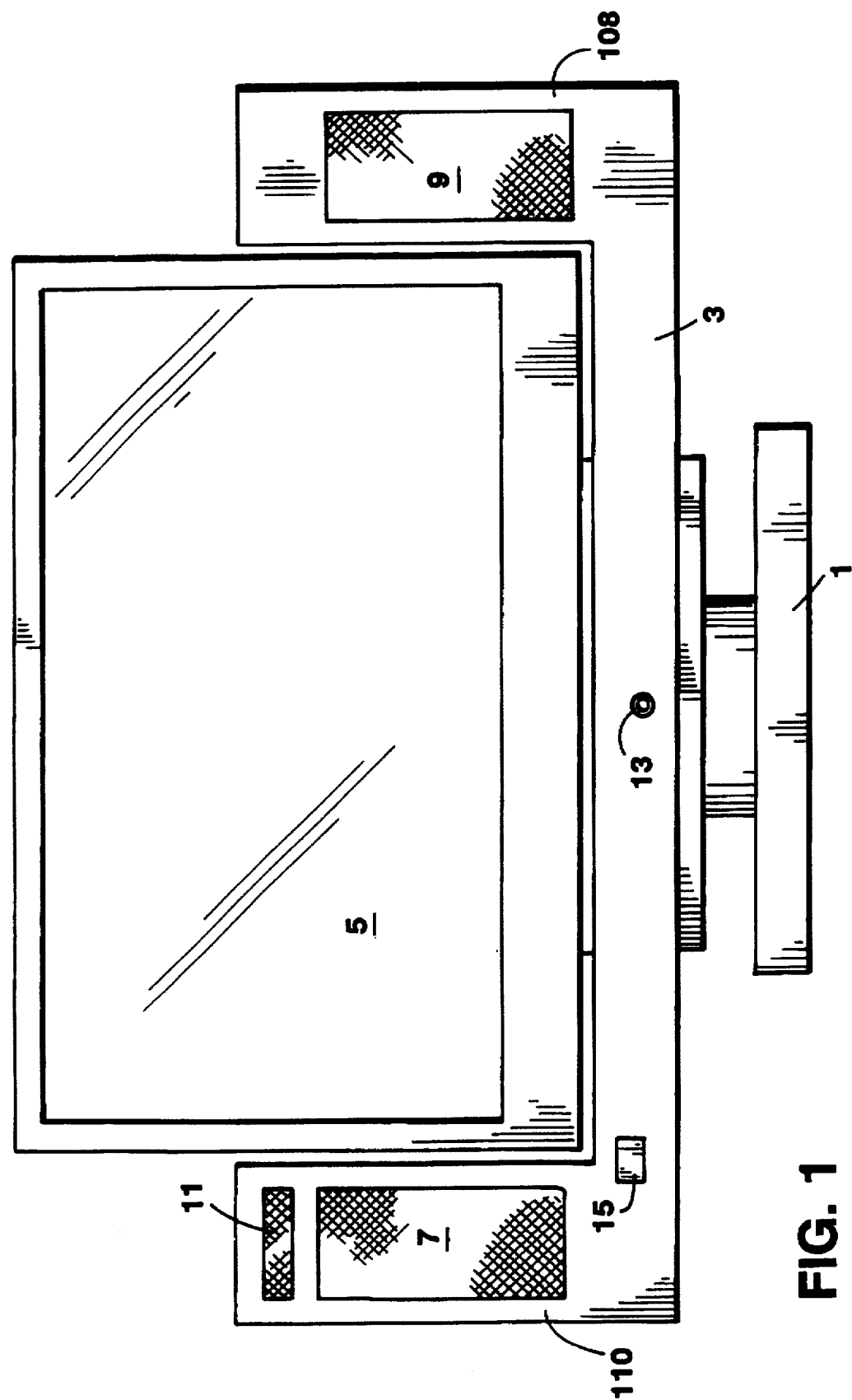
FIG. 1 is a front view of video and audio interface components of a multimedia computer.

In FIG. 1, a pedestal 1 supports an essentially U-shaped audio module 3. A video monitor 5 is disposed and held within the opening defined by the U-shaped audio module 3. The audio module 3 comprises a right (when facing away from the monitor) speaker 7 housed in a speaker portion 110, a left speaker 9 housed in a speaker portion 108, and a microphone 11 disposed adjacent one of the speakers, e.g., the right speaker 7. The audio module 3 is provided with a headphone jack 13 that allows the user to bypass the speakers by plugging in a standard pair of audio headphones. A speaker mute button 15 is also provided to allow the user to temporarily disable the speakers.

The audio module 3 provides a mounting structure that causes the left and right speakers and the microphone to be oriented along the viewing axis 17 (FIGS. 4 and 5) of the monitor and maintains a fixed orientation among the speakers and the microphone. Thus, if the monitor is moved up or down (tilted) or is swiveled on the pedestal, the relative orientation of the speakers, the microphone, and the monitor will remain the same.

Figure 2:
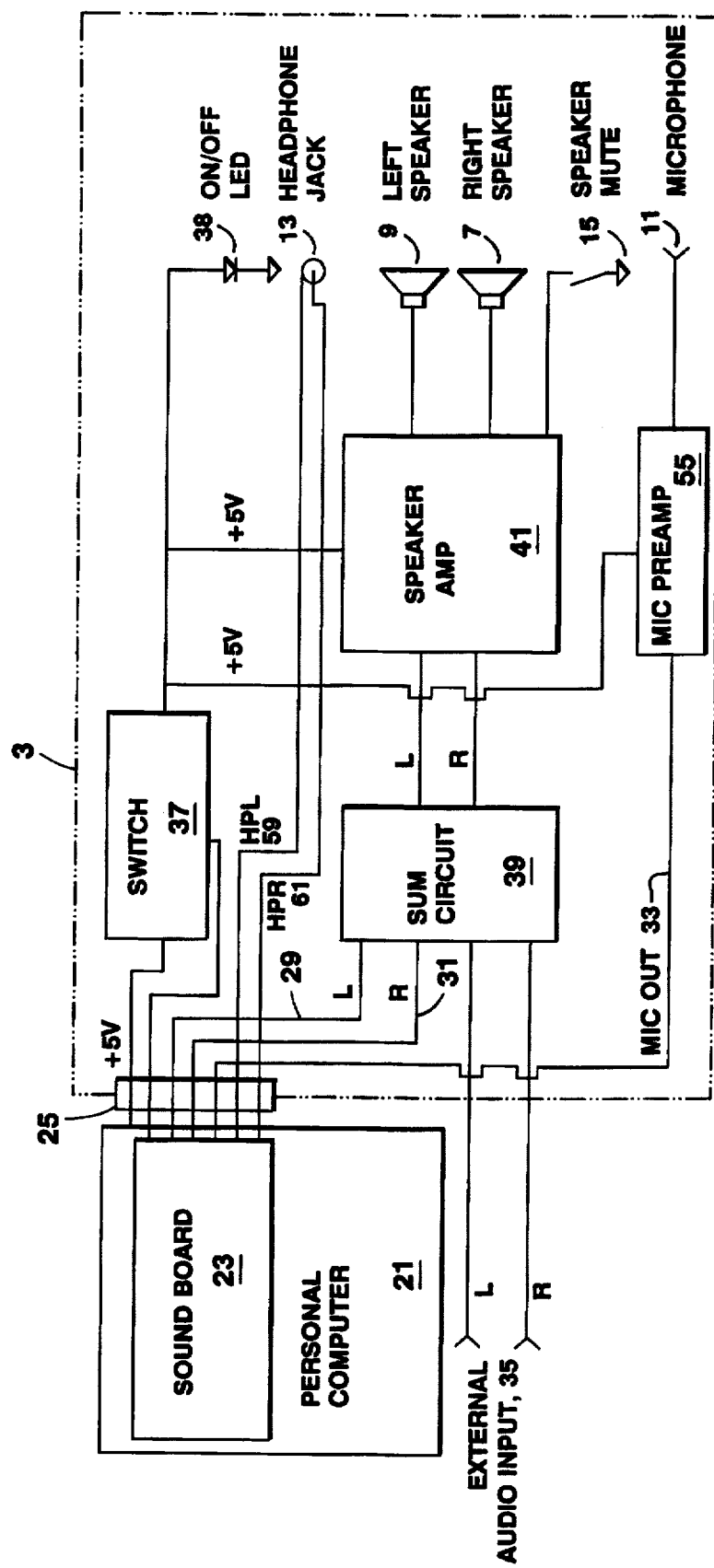
FIG. 2 is a block diagram of an audio system for a multimedia computer.

In FIG. 2, all of the components of the multimedia system are disposed within the audio module 3 except for personal computer 21 and sound board 23. The sound board 23 is connected to the audio module 3 via a standard connector 25, which may comprise a ribbon connector, a cable, or any other conventional connector.

The audio module 3 is provided with a +5 volt power supply by the computer 21 via the connector 25, or from an external input or internal supply. The sound board 23 generates an on/off control 27, which is applied to a switch 37 via the connector 25. On/off control 27 controls switch 37 to allow software control of the on/off state of audio module 3. On/off LED 38 is illuminated when switch 37 is on to indicate active status of the audio module.

Sound board 23 also generates left and right audio inputs 29 and 31, respectively, which are supplied to the audio module via the connector 25. The output 33 from microphone 11, discussed in more detail below, is supplied back to the sound board via the connector 25.

An external audio input 35 is provided on the audio module to allow connection of an external audio signal source such as a CD player. The left and right channels from the external audio input 35 and the left and right audio inputs 29, 31 generated by the sound board are applied to a sum circuit 39. Sum circuit 39 combines these inputs into a single left and a single right channel, which are applied to speaker amp 41. Optionally, the left and right channels from the external audio input 35 may also be fed back to the sound board 23 via connector 25 (see FIG. 3).

Speaker amp 41 receives +5 volt power from switch 37 when the audio module is active. Speaker amp 41 amplifies the left and right audio signals to an appropriate level to drive right speaker 7 and left speaker 9. Headphone jack 13 is supplied with audio signals directly from the sound board 23 via headphone left (HPL) line 59 and headphone right (HPR) line 61. Headphone jack 13 is equipped with a conventional mechanical switch which disconnects the left and right speakers in the event a headphone is plugged into the jack. Optionally, a headphone detect line (shown in FIG. 3) may be provided to detect the presence of a headphone and supply this information to sound board 23 via connector 25.

Sound board 23 has the ability to drive speakers 7 and 9 according to software being run by computer 21. The speakers 7 and 9 can be driven together or individually. Thus, computer 21 has complete and active control of the output of the speakers 7 and 9.

Speaker mute button 15, when actuated by the user, disables the speaker amp 41 so as to bypass software control and turn off the speakers. Re-actuation of button 15 turns the speakers back on.

The output of microphone 11 is applied to mic preamp 55, which generates mic out signal 33. Mic preamp 33 receives +5 volt power from switch 37 when the audio module is active. As noted above, mic out signal 33 is applied to the sound board 23 via the connector 25.

In the interest of expense and/or simplicity, the audio module 3 can be made as a completely passive device by omitting amplifier 41 and mic preamp 55. In this event, the +5 volts applied to the audio module, the switch 37, and on/off control 27 also become unnecessary. While the ability to drive the speakers is limited in this embodiment, this embodiment has the advantage that only standard left and right audio inputs and a standard mic output are necessary, allowing use of the audio module with sound boards not specifically designed for this application.

In operation, when the multimedia system of the invention is in "speaker mode", the speakers 7, 9 are driven by sound board 23 under software control by computer 21. The sound output may comprise music from a CD-ROM associated with the computer 21, or audio accompaniments to a program being run on the computer. Thus, the audio module attachment can function as a "stereo" to provide music, or can function to provide high fidelity audio accompanying a computer program. Additionally, in another mode, it may be desirable to use the audio module as a speaker phone. This allows the multimedia computer to perform yet another significant office function and makes the freestanding speaker phone obsolete. Because the orientation of the sound axes of the speakers and the microphone mounted in the audio module are parallel to the line of sight 17 of the monitor, the user can operate the computer, possibly on line with another user via a modem, while simultaneously communicating verbally via the audio module.

Because the relative placement of the left and right speakers and the microphone is fixed, echo cancellation techniques can be very effective in eliminating feedback of the remote speaker's voice, thus allowing the audio module to operate as a full-duplex speaker phone. To further eliminate feedback, when the computer is in "speaker phone mode," sound board 23 supplies the voice line from the remote user on only the left speaker 9, i.e., the speaker remote from the microphone 11. The right speaker 7 adjacent the microphone is not driven in speaker phone mode. Thus, the possibility of feedback is virtually eliminated, and effective full-duplex speaker phone operation is made possible.

A detailed schematic diagram according to an embodiment of the invention is shown in FIG. 3. In this embodiment, the +5 volt supply is shown as a separate input 51 on the audio module 3. This +5 volt supply is applied directly to switch 37, which is constructed in a conventional manner.

In this embodiment, connector 25 includes a standard 20 pin DIN connector 53 which supplies, among others, the on/off control 27 to the switch 37.

The left and right audio inputs 29, 31 and the left and right channels from the external audio input 35 are applied to sum circuit 39. Sum circuit 39 is made up of a first op amp 39A for the left channel and a second op amp 39B for the right channel, as well as capacitors and resistors arranged in a conventional manner to provide proper bias levels. The left and right channels of the external audio input 35 are additionally fed back through the 20 pin DIN connector 53 via "L-out" and "R-out" lines 55, 57, respectively, to allow monitoring of these signals by the sound board 23. The outputs of the op amps 39A, 39B of sum circuit 39 are applied to amplifier 41, which in turn drives left and right speakers 7, 9. Amplifier 41 may be any appropriate commercially available IC amplifier.

Headphone jack 13 is driven directly by headphone left (HPL) and headphone right (HPR) lines 59, 61, via the 20 pin DIN connector. The amplifier 41 is bypassed in the headphone circuit because the typical output of an amplifier designed for use with high fidelity speakers would be undesirably high for use with headphones.

As discussed above, speaker mute button 15 is provided on the audio module which allows a hardware disconnect of the speakers 7, 9. This mute button is useful for situations where a temporary disabling of software control of the speakers is desired. Sense line 65 is provided which detects the presence of a headphone and supplies this information to the sound board 23 via the 20 pin DIN connector 53.

Circuits 67, 69, and 71 perform signal conditioning and/or bias level adjustment functions in a manner well known to the skilled artisan.

Figure 4:
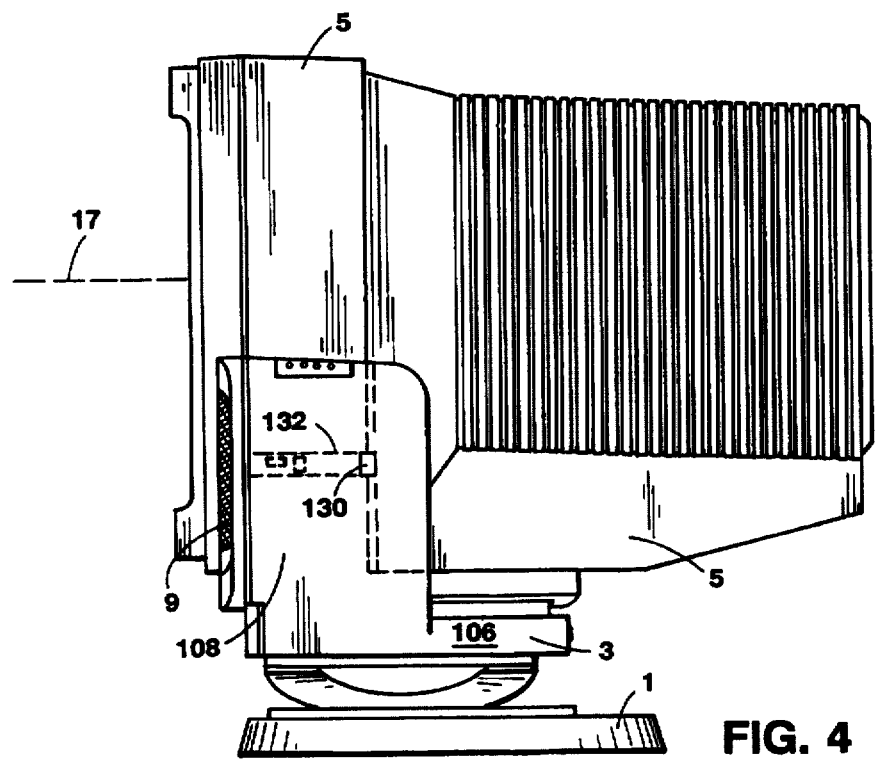
FIG. 4 is a side view of video and audio interface components of a multimedia computer.

As shown in FIGS. 1 and 4, a base portion 106 of the audio module 3 is positioned between the video monitor 5 and the pedestal 1. This permits the video monitor 5 and the audio module 3 to form an integrated multimedia system. Pedestal 1 typically is a separate structure from video monitor 5. The practice has developed in the computer industry of a given monitor manufacturer producing relatively few styles of pedestals for use with many different monitors. For example, a single pedestal 1 may be used with different models of 14-inch or 15-inch monitors produced by the manufacturer. As will be discussed in more detail below, the attachment of pedestal 1 to video monitor 5 typically involves tongue-and-groove or snap-lock engagements at a mechanical interface. Such pedestals are removable from and reattachable to the video monitor 5 at this interface.

Figure 5:
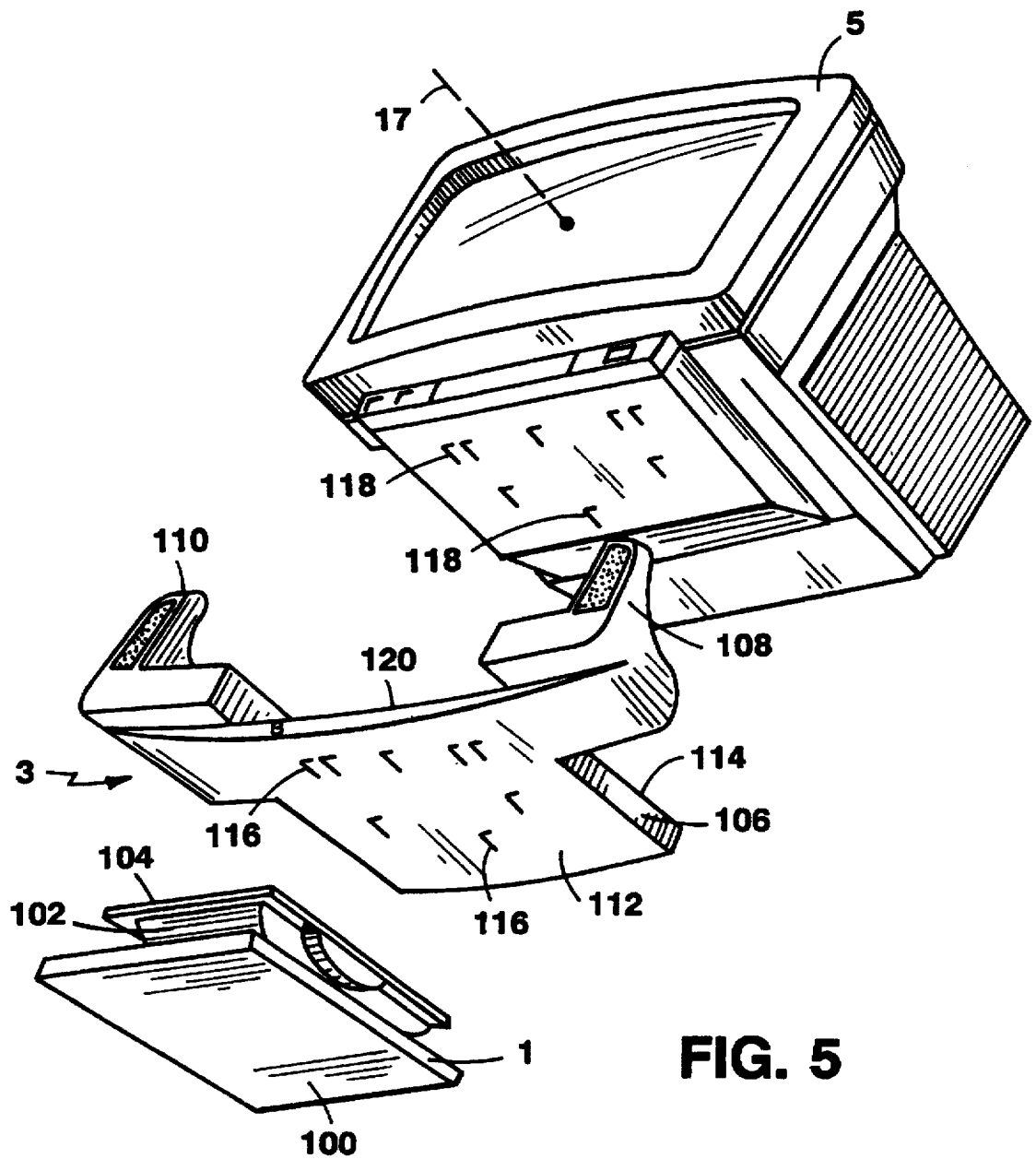
FIG. 5 is an exploded perspective view of a multimedia monitor.

One aspect of the invention allows a user to take an existing video monitor 5, detach the pedestal 1 from the video monitor 5, physically attach an audio module 3 to the bottom of the video monitor 5 and then attach the pedestal 1 to the bottom of the audio module 3. This sequence is depicted in exploded view in FIG. 5. FIG. 5 illustrates the pedestal 1 having a base 100 and a rocker 102. The rocker 102 is coupled to the pedestal base 100 such that the rocker 102 is capable of tilting up and down and swiveling from side to side. Not shown in FIG. 5 are pedestal-to-monitor engaging means 104. Audio module 3 is shown disposed between pedestal 1 and the video monitor 5. The audio module 3 is shown to be comprised of a base portion 106 and two speaker portions 108 and 110. The base portion 106 of audio module 3 has a first or lower surface 112 and a second or upper surface 114. The first surface 112 has pedestal attaching means 116 which correspond substantially to the pedestal attaching means 118 located on video monitor 5. Pedestal attaching means 116 and 118 may take the form of grooves or tongues for tongue-in-groove engagement, recesses or protuberances for snap and lock engagement or guides and bosses for screw engagement. There are numerous and different ways and means of attaching the pedestal 1 to the video monitor 5 and thus there are numerous and different ways and means of attaching the pedestal 1 to the audio module 3 and the audio module 3 to the monitor 5. The second surface 114 of audio module 3 is formed to follow the contours of the video monitor 5 and thereby closely mate audio module 3 to video monitor 5. Second surface 114 includes monitor engaging means 120 (not shown) that are substantially identical to the monitor engaging means 104 on the pedestal 1. Monitor engaging means 120 engage pedestal attachment means 118 in video monitor 5.

Thus, an aspect of the invention allows a conventional video monitor 5 to be upgraded to multimedia functionality by installing an audio module 3 between the video monitor 5 and the monitor pedestal 1. The invention utilizes the existing attachment scheme of the pedestal 1 and the video monitor 5 and therefore typically does not require structural modification of the monitor 5 or pedestal 1. Further, the invention permits the video monitor 5 and audio module 3 to tilt and swivel in concert about the pedestal 1. This "line of sight" orientation is significant, as discussed above, for speaker phone functionality and for general multimedia functionality. Further, the present invention is not tied to the computer housing, which allows the user to place the computer housing out of the way to conserve valuable desktop space.

Figure 6A:
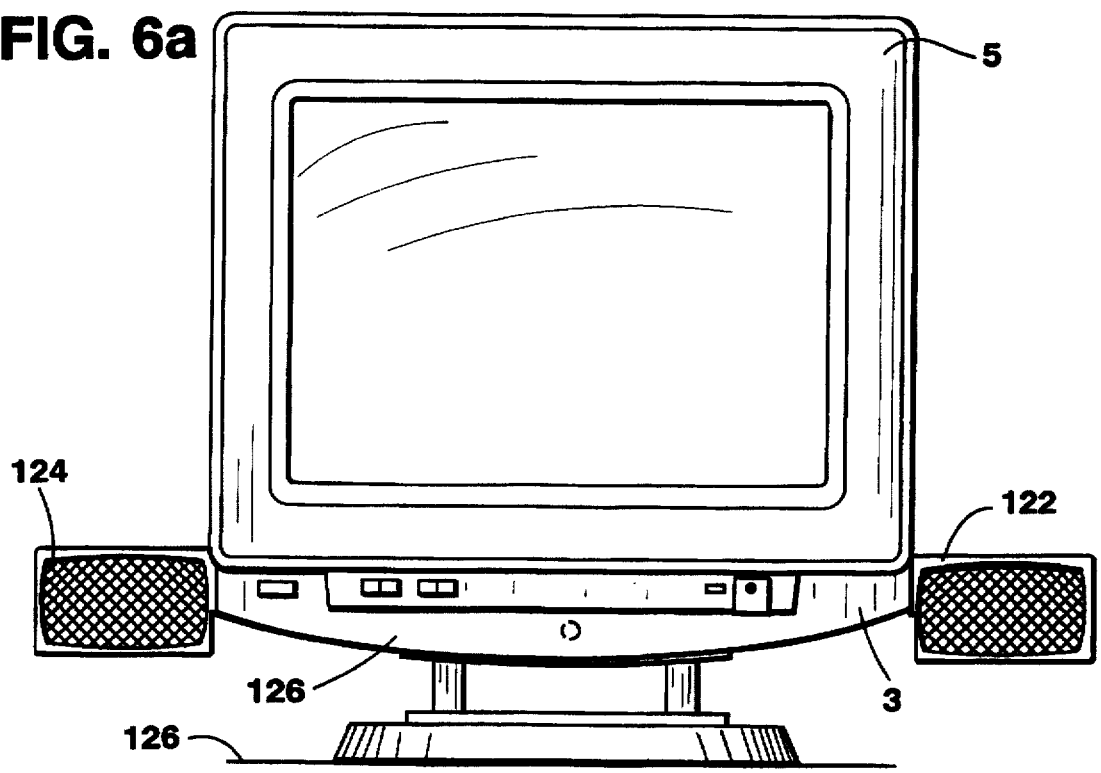
FIGS. 6a and 6b are front and side views, respectively, of a multimedia monitor.
Figure 6B:
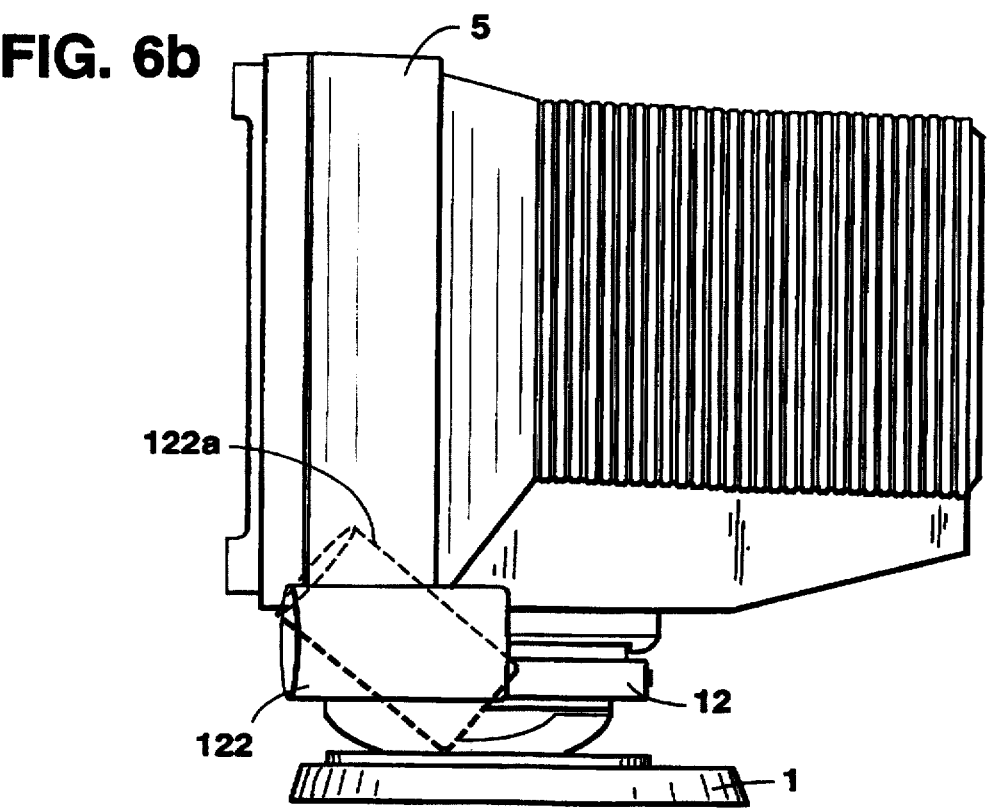
Figure 8:
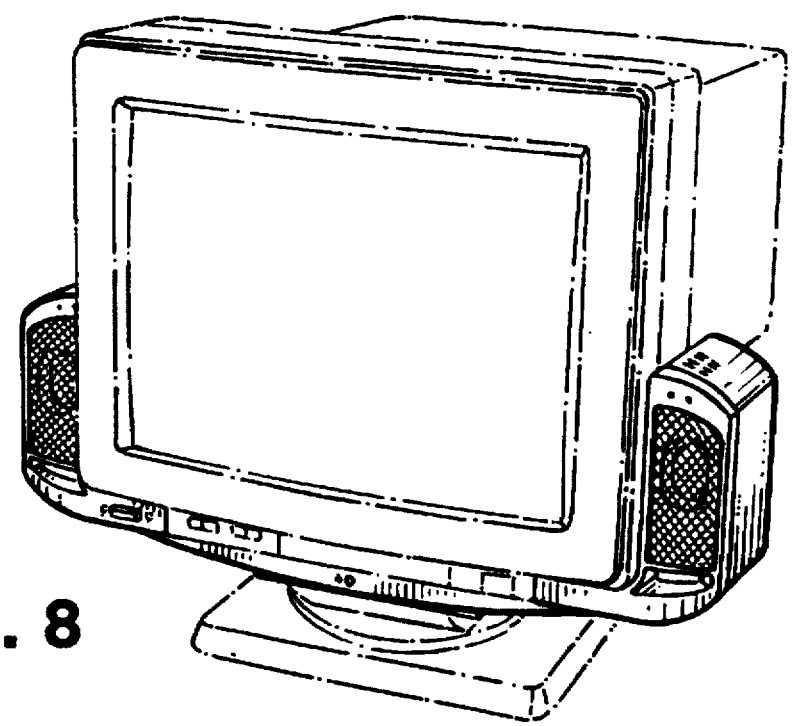
FIG. 8 is a front, right side, top perspective view of an audio module showing our new design as it is attached to a monitor, the monitor being shown for illustrative purposes only and not forming a part of the claimed design.
Figure 9:
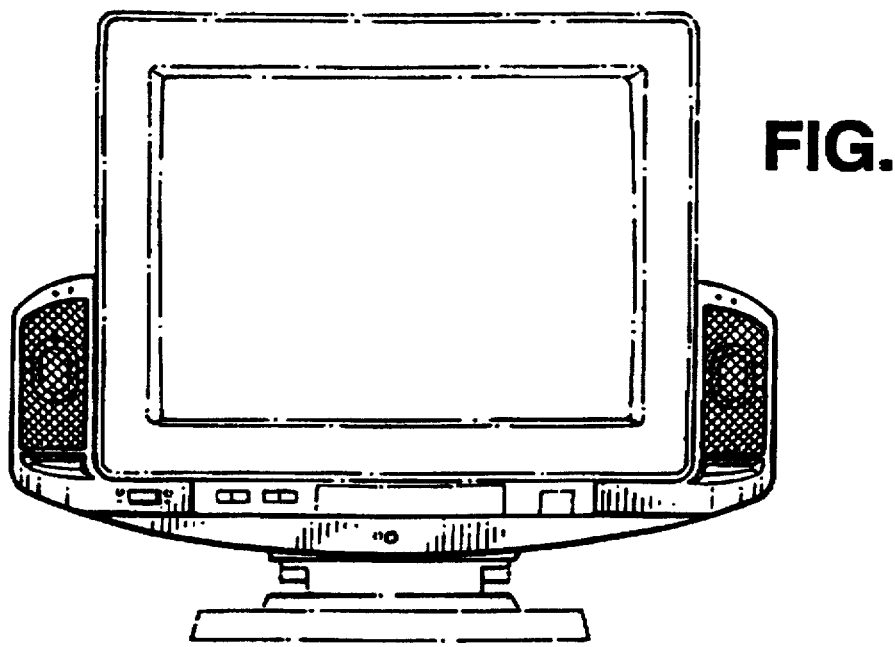
FIG. 9 is a front elevational view of the audio module shown in FIG. 8, the monitor being shown for illustrative purposes only and not forming a part of the claimed design.
Figure 14:
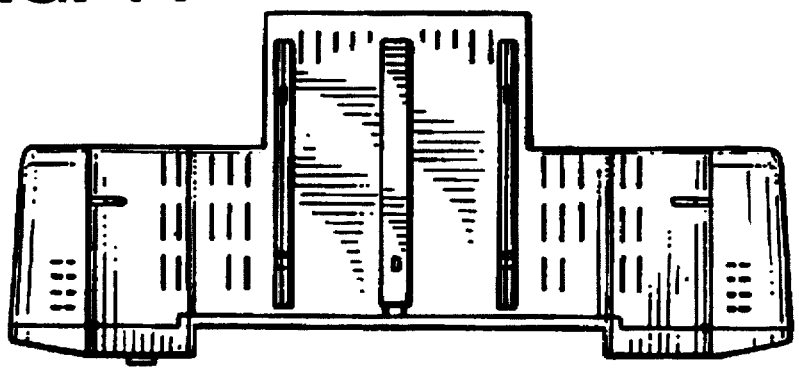
FIG. 14 is a top plan view thereof.
Figure 15:
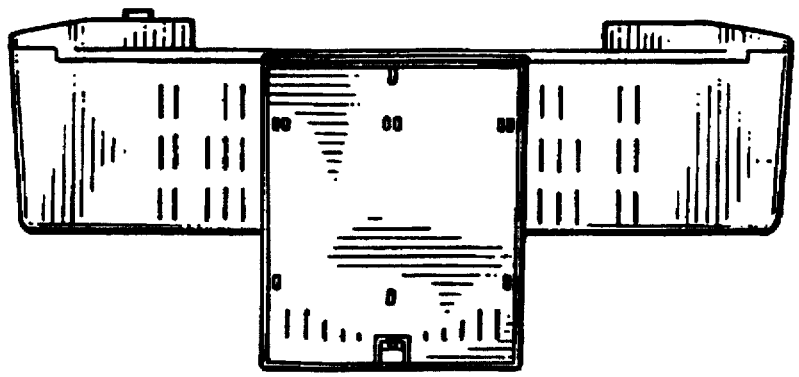
FIG. 15 is a bottom plan view thereof.
Figure 16:
FIG. 16 is a rear elevational view thereof.

FIGS. 6a and 6b illustrate other aspects of the invention. FIG. 6a illustrates audio module 3 having speaker portions 122 and 124 that are substantially coplanar with base portion 126. As shown in FIG. 6b, speaker portions 122 and 124 are pivotably mounted to the base portion 126 of audio module 3. This mounting arrangement allows the user to adjust the orientation of speaker portion 122 and 124 to achieve the acoustics desired by the user while retaining the feature that when the monitor is reoriented so are the speakers.

It will be appreciated that users often relocate the video monitor 5 to different offices, different desks or different positions on a desk. Because monitors typically can weigh upwards of 30 pounds, it is to be expected that users likely will grab onto speakers portions 122 and 124 (or speakers portions 108 and 110 of FIG. 5) when moving and lifting the monitor 5. Thus, audio module 3 should be structurally sufficient to permit such lifting and moving by the speaker portions or such lifting and moving should be strongly discouraged. Referring back to FIG. 4, left speaker portion 108 is shown to have a guide 130 that engages an existing monitor screw hole 132 in the monitor 5. The attachment of guide 130 and screw hole 132 imparts structural integrity to the audio module 3.

Figure 7:
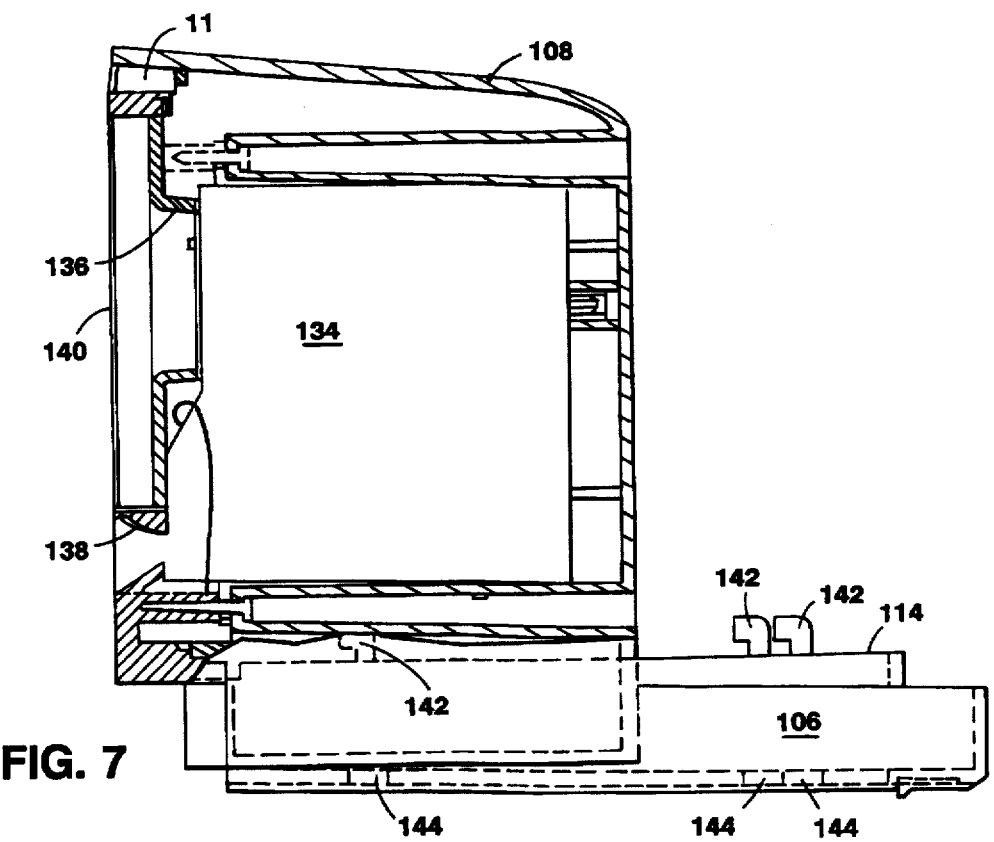
FIG. 7 is a side view, partially in cross-section of a speaker portion of an audio module.

FIG. 7 illustrates a partial cross-sectional view of a speaker portion of the invention such as speaker portion 108. Speaker portion 108 (and audio module 3), can be fabricated from conventional injection mold plastics as are commonly used in the computer industry. Speaker portion 108 is shown to house speaker 134. Speaker 134 is preferably a self-contained speaker unit comprising a full range speaker element (not shown) or individual speaker components and frequency cross-over networks (also not shown). The speaker unit 134 preferred for the invention is manufactured by Panasonic and contains a full range speaker element in a ported enclosure. Speaker portion 108 is designed for speaker 134 to be placed within speaker portion 108 such that the full range speaker element substantially aligns with port 136 and the speaker port substantially aligns with port 138. A substantially acoustically transparent grill 140 protects speaker 134. The invention allows a user to replace speaker 134 when the user desires to upgrade the audio module 3 or to repair the audio module 3. Also shown in FIG. 7 is the fixed location of microphone 11 in speaker portion 108.

The base portion 106 of the audio module 3 shown in FIG. 7 has a plurality of tongues 142 protruding from and forming a part of the second or upper surface 114. These monitor engaging means 120 engage with corresponding grooves (pedestal attachment means 118) in video monitor 5. The base portion 106 also includes a plurality of grooves 144 on and a part of the first or lower surface of the base portion 112. These grooves (pedestal attaching means 116) engage corresponding tongues (pedestal engaging means 104) on the pedestal 1.

Preferred embodiments of the invention have been shown and described in detail. However, the invention is not so limited, but rather is limited only by the scope of the claims.

What is claimed is:

1. An audio module for use with a monitor that is supported by a pedestal at a mechanical interface and is removable from the pedestal at the interface, the interface including an element on the monitor that mates removably with an element on the pedestal, the audio module comprising:

a base that includes two mating devices, one configured to mate with the interface element on the monitor, the other configured to mate with the interface element of the pedestal so that the module may be interposed between the monitor and the pedestal; and a speaker mounted on the base.

2. The module of claim 1, wherein each said mating device comprises a mating surface.

3. The module of claim 1, wherein said module is adapted to be held in a fixed position relative to the monitor regardless of reorientation of the monitor relative to the pedestal.

4. The module of claim 1 further comprising a second speaker.

5. The module of claim 4 wherein the base is generally planar in shape and the speakers are essentially in the same plane as the base.

6. The module of claim 4 wherein the base is generally planar in shape and the speakers are not in the same plane as the base.

7. The module of claim 1 further comprising a headphone jack mounted on the base.

8. The module of claim 1 further comprising a speaker mute switch mounted on the base.

9. The module of claim 1 further comprising a microphone mounted on the base.

10. The module of claim 9 wherein the microphone is mounted at one end of the base and the speaker is mounted at another end of the base.

11. The module of claim 1 wherein the speaker is reorientable relative to the base.

12. A method of upgrading a computer monitor attached to a supporting pedestal and that is capable of being swiveled and tilted, comprising the steps of:

detaching the monitor from the pedestal;

attaching an audio module to the monitor at the place where the monitor was detached from the pedestal so that the audio module moves with the monitor when the monitor is swiveled and tilted; and attaching the module to the pedestal at the place where the pedestal was detached from the monitor.

13. An audio module, comprising:

a base portion;

a speaker portion adjacent said base portion, said speaker portion housing a speaker;

a first surface of said base portion adapted to removably engage a pedestal mating surface on a monitor;

a second surface of said base portion adapted to removably engage a monitor pedestal such that said audio module can be removably interposed between said pedestal and said monitor; and said audio module coupled to said monitor such that said module and said monitor move in concert relative to said pedestal.

14. The audio module of claim 13 wherein said speaker portion is disposed adjacent a first end of said base portion and further comprising a second speaker portion disposed adjacent a second end of said base portion.

15. The audio module of claim 14, wherein said speaker portions are substantially coplanar with said base portions.

16. The audio module of claim 14, wherein said speaker portions are substantially non-coplanar with said base portions.

17. The audio module of claim 13, wherein said speaker is a self-contained speaker unit and is removable from said speaker portion.

* * * * *